United States Patent [19]

Keiser et al.

[11] Patent Number: 4,630,978
[45] Date of Patent: Dec. 23, 1986

[54] THREAD CHASING TOOL

[75] Inventors: Terry L. Keiser, 2148 Euclid Ave., El Cajon, Calif. 92021; Charles L. Guinnip, Chula Vista, Calif.

[73] Assignees: Terry L. Keiser; Grant Y. Keiser, both of El Cajon, Calif.

[21] Appl. No.: 783,775

[22] Filed: Oct. 3, 1985

[51] Int. Cl.[4] .................................................. B23G 5/04
[52] U.S. Cl. ........................................ 408/159; 10/1 B; 10/120; 10/123 S; 408/239 R
[58] Field of Search ................ 10/1 B, 111, 120, 121, 10/123, 143, 144, 145; 408/158, 159, 180, 221, 218, 239, 240

[56]  References Cited

U.S. PATENT DOCUMENTS

| | | | |
|---|---|---|---|
| 1,135,057 | 4/1915 | Schultis | 408/159 X |
| 1,392,705 | 10/1921 | Rhodes | 10/123.5 |
| 1,785,406 | 12/1930 | Cornett | 10/1.13 |
| 2,567,480 | 9/1951 | Heldenbrand | 10/1 |
| 2,616,103 | 11/1952 | Stecher | 10/145 X |
| 2,700,166 | 1/1955 | McKenzie | 10/1 |
| 3,956,787 | 5/1976 | Crumpacker | 10/1 B |
| 4,150,450 | 4/1979 | Laub, Jr. et al. | 10/1 B |
| 4,346,491 | 8/1982 | Kraus et al. | 10/111 |
| 4,411,324 | 10/1983 | Liebig | 408/159 X |

FOREIGN PATENT DOCUMENTS

| | | | |
|---|---|---|---|
| 2316033 | 1/1977 | France | 10/1 B |
| 553103 | 4/1943 | United Kingdom | 10/121 |

Primary Examiner—E. Michael Combs
Attorney, Agent, or Firm—Brown, Martin, Haller & Meador

[57] ABSTRACT

A tool for cleaning or repairing the screw threads on studs, bolts and the like comprises inner and outer relatively slidable sleeve members and a series of die elements rockably mounted between the sleeve members adjacent one end or mouth of the tool so as to be urged by relative sliding movement between the members in opposite directions between the expanded position and a contracted position in which inwardly facing thread cutting teeth on the die elements are urged into a thread engaging position with a threaded member inserted into the mouth of the tool.

9 Claims, 6 Drawing Figures

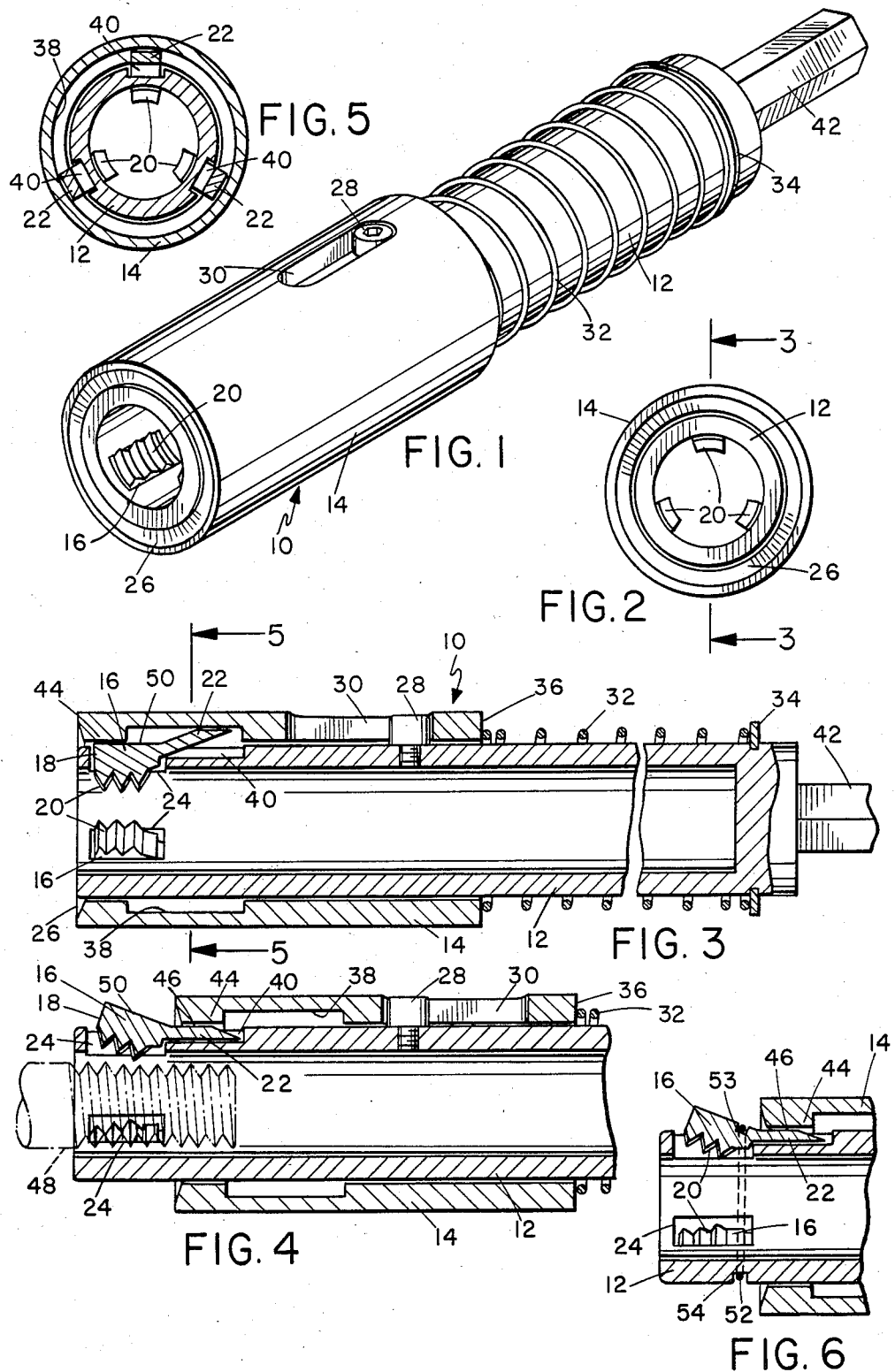

THREAD CHASING TOOL

BACKGROUND OF THE INVENTION

The present invention relates to a tool for cleaning or repairing the screw threads on studs, bolts, and similar threaded members.

Such tools generally comprise a device having internal thread-cutting dies or teeth in which the stud or bolt is clamped. The tool is then backed off or unscrewed to reset the threads.

In U.S. Pat. No. 2,700,166 of McKenzie, for example, a rethreading tool comprising a cup shaped holder containing opposed jaw members is shown. The jaw members have opposed semi-circular thread cutting teeth. The jaws are spread apart to receive a member to be rethreaded by a cam mechanism.

U.S. Pat. No. 3,956,787 of Crumpacker describes a thread reconditioning tool comprising a hollow tube slidably receiving a collet chuck which is connected to a handle for moving the chuck between an extended and retracted position. The chuck has internal thread cutting teeth on separate jaws which are contracted together to grip a stud or bolt on retraction into the tube by means of inclined cam surfaces on the jaws.

SUMMARY OF THE INVENTION

According to the present invention, a thread chasing tool is provided which comprises inner and outer relatively slidable sleeve members and a series of die elements rockably mounted between the sleeve members adjacent one end of the tool.

The die elements have inwardly facing thread cutting teeth and outwardly facing cam surfaces which co-operate with the outer sleeve member to urge the cutting teeth inwardly and outwardly on movement of the outer sleeve member in opposite directions.

In a preferred embodiment of the invention, each die element has a head portion on which the cutting teeth are located and a tail portion inclined relative to the head portion which is trapped between the sleeve members.

When the outer sleeve member is drawn over the tail portion, it acts to rock the head portions of each die member outwardly into a released or expanded position in which the threaded member to be repaired can be easily placed within the tool. When the outer sleeve member is then drawn back over the head portion, it urges the head portion of each die element inwardly to clamp the threaded member between the cutting teeth rocking the tail portion outwardly at the same time. Subsequent backing off or unscrewing of the tool will reset the threads of the threaded member.

Preferably, the inner sleeve member is provided with slots through which the head portions of the respective die elements project to clamp a threaded member. Internal recesses are provided in the outer sleeve to allow sufficient space for the rocking movement of the tail portion of each die element.

According to another preferred feature of the present invention, a stop is provided to limit relative sliding movement between the sleeve members in opposite directions. This preferably comprises a pin or stud on one of the members which projects through an aligned longitudinal slot in the other member.

A spring may be provided to urge the outer sleeve member in a direction to rock the die elements into their clamped or contracted position. Thus, to place a threaded member such as a stud or bolt in the tool, the outer sleeve member is simply drawn in one direction against the action of the spring to spread the die elements apart, the threaded member is positioned between the expanded die elements, and the outer sleeve member is released to be forced back by the spring to urge the die elements together and clamp the threaded member in place.

Thus, according to the present invention, a threaded member can be quickly and easily clamped by the thread chasing tool so that its threads can be cleaned or recut. The thread cutting teeth or dies of the die element are angled to cut teeth when the tool is backed off or unscrewed. The tool may be provided with a suitable shank or handle for unscrewing using a wrench, for example.

BRIEF DESCRIPTION OF THE DRAWING

The present invention will be better understood from the following description of a preferred embodiment, taken in conjunction with the accompanying drawings in which like reference numerals refer to like parts and in which:

FIG. 1 is a perspective view of the thread chasing tool;

FIG. 2 is an end view thereof;

FIG. 3 is a sectional view taken on line 3—3 of FIG. 2;

FIG. 4 is a similar sectional view, but with the threading dies retracted for insertion or removal of a threaded stud;

FIG. 5 is a sectional view taken on line 5—5 of FIG. 3; and

FIG. 6 is a sectional view similar to a portion of FIG. 4, showing a retaining ring around the threading dies.

DESCRIPTION OF THE PREFERRED EMBODIMENT

The drawings show a preferred embodiment of a thread chasing tool according to the invention.

The tool 10 basically comprises an inner sleeve member 12, an outer sleeve member or collar 14 slidable back and forth on the inner sleeve member, and a series of die elements or jaws 16 rockably mounted between the inner and outer sleeve members adjacent one end of the tool.

As best seen in FIGS. 3 and 4, each die element 16 comprises a head portion 18 having inwardly facing threading dies or thread cutting teeth 20, and a tail portion 22 which is angled relative to the head portion. The inner sleeve member 12 is provided with a series of slots 24 aligned with the head portions of the respective die elements 16. In the preferred embodiment of the invention shown there are three die elements 16 spaced equally at 120° intervals around the mouth 26 of the tool (see FIG. 5). However, a greater or lesser number of die elements may be provided in alternative arrangements.

Relative sliding movement between the sleeve members is limited by the stud or stop member 28 on the inner sleeve member 12 which projects outwardly into an aligned longitudinal slot 30 in the outer sleeve member 14. This also prevent relative rotation between the sleeve members. As best shown in FIGS. 1 and 3, a spring 32 acts between a clip ring 34 on the opposite end of the inner sleeve member to the die elements and the corresponding end 36 of the outer sleeve member 14, so as to urge the outer sleeve member outwardly towards the mouth end of the tool.

As seen in FIGS. 3 and 5, the outer sleeve member has an annular inner recess 38 for allowing rocking movement of the die elements 16. The inner sleeve member has a series of locating grooves or recesses 40 for locating the tail portions of the die elements in their expanded position as shown in FIG. 4.

A shank 42 for receiving a wrench projects from the inner sleeve at opposite end of the tool to the die elements 16, as best shown in FIG. 1.

In order to position a threaded stud or similar device in the tool for rethreading or cleaning, the outer sleeve member is first drawn back away from the mouth of the tool into the position shown in FIG. 4. This causes a camming action between the outer end 44 of the sleeve member 14 and the angled outer surface 46 of the tail portion of each of the die elements. The camming action urges the tail portions inwardly, rocking the head portions outwardly into the expanded position shown in FIG. 4, with the tail portions trapped in recesses 40 by the outer end 44 of the sleeve member.

A threaded stud 48 can then be placed inside the inner sleeve member between the opposed inwardly facing thread cutting teeth 20 of the die elements. The outer sleeve member is then released so that the spring 32 urges it back outwardly towards the mouth of the tool. The outer end 44 of the sleeve member then acts against the outer surface 50 of the head portion of each die element, rocking the head portions inwardly through the slots 24 into the contracted or thread engaging position shown in FIG. 3 in which the thread cutting teeth are clamped around the threaded stud and locked by the outer end 44 of sleeve member 14 into the thread engaging position. At the same time, tail portions 22 rock outwardly into recess 38. Outward movement of the outer sleeve member 14 is limited by the engagement of the stop 28 with the end of the slot 30, as shown in FIG. 3.

In an alternative arrangement the head portions 18 of each die element may simply project outwardly from the outer end of the inner sleeve member 12, instead of providing slots 24 in the inner sleeve member to permit the inward and outward rocking motion of the die elements. However, the provision of slots 24 is preferred since this helps to locate the die elements in the correct radial position.

When a threaded member such as a stud or bolt is clamped by the die elements in the contracted position shown in FIG. 3, a suitable wrench or handle can be applied to the shank 42 of the tool in order to rotate or unscrew the tool from the stud or bolt. The dies or teeth 20 of the die elements are angled to cut when backing off the tool, so that the threads of a stud or similar device held between the teeth will be cleaned or recut. The teeth may be angled to cut in either the left or right hand direction.

Thus, the thread chasing tool can be quickly and easily applied to clean and repair threaded studs or bolts with relatively little manipulation. All that is required is a simple sliding motion of the outer sleeve member to expand the die elements for insertion of the stud, bolt or other threaded device, with no other awkward manipulations being required.

The tool can be used to clean dirty or caked threads and to repair damaged threads on studs, bolts and the like.

FIG. 6 illustrates an optical modification to the tool in which an O or C-ring retainer 52 surrounds the head portions of the die elements and recesses in grooves 53 in the die elements and an aligned groove 54 in the inner sleeve member 12 for axial location of the die elements. The tool is otherwise identical to that shown in FIGS. 1 to 5 and equivalent reference numerals have therefore been used for corresponding parts.

Although a preferred embodiment of the invention has been described above by way of example, it will be understood by those skilled in the field that modifications may be made to the disclosed embodiment without departing from the scope of the invention, which is defined by the appended claims.

We claim:

1. A thread chasing tool, comprising:
inner and outer relatively slidable cylindrical sleeve members;
the inner sleeve member having a through bore and a series of spaced slots around its periphery adjacent one end of the tool;
a plurality of separate die elements rockably and releasably mounted between the opposed inner and outer surfaces of said outer and inner sleeve members adjacent said one end of the tool;
each die element comprising a head portion and a tail portion, the head and tail portions each having an outwardly directed cam surface for engagement with the inner surface of the outer sleeve member, the cam surfaces being angled relative to one another, the head portion having inwardly facing thread cutting teeth each die element having its head portion aligned with a respective one of said slots; and
the outer cam surfaces on said die elements and the opposing inner surface of said outer sleeve member comprising cooperating means for urging said die elements back and forth between an expanded position in which said head portion is expanded out of said slots and a contracted, thread engaging position in which said head portion projects partially through said slots so that said thread cutting teeth project inwardly into the central bore of said inner sleeve member to engage a threaded member inserted in said one end of said inner sleeve member in response to relative sliding movement of said sleeve member in opposite directions.

2. The tool as claimed in claim 1, in which said outer sleeve has an inner annular recess aligned with said tail portions in said contracted positions of said die elements.

3. The tool as claimed in claim 1, including resilient means for urging said outer sleeve member in a direction urging said die elements into the thread engaging position.

4. The tool as claimed in claim 1, further comprising a stop projecting radially from one of said sleeve members, the other said sleeve member having a longitudinal slot into which said stop projects to limit relative movement between said sleeve members in opposite directions.

5. The tool as claimed in claim 1, said tool having an open mouth at one end for receiving a threaded member and a wrench receiving shank projecting from the opposite end of said tool.

6. The tool as claimed in claim 1, wherein said die elements are located adjacent one end of said inner sleeve member and are arranged at equal angular spacings around said end.

7. The tool as claimed in claim 6, wherein there are three die elements.

8. The tool as claimed in claim 1, including a retaining ring extending around said die elements, said die elements and said inner sleeve member having aligned grooves in which said retaining ring is located.

9. A thread chasing tool, comprising:
   inner and outer relatively slidable hollow cylindrical sleeve members, one end of said inner sleeve member comprising means for receiving a threaded workpiece and the other end of said inner sleeve member having a wrench receiving shank;
   a series of separate rockable die elements releasably trapped between the inner face of said outer sleeve member and the outer face of said inner sleeve member adjacent said one end, each die element having inwardly facing thread cutting teeth and an outer cam surface facing the inner surface of said outer sleeve member, the cam surface having first and second portions angled relative to one another, the outer sleeve member having an inwardly facing cam means for engaging said first portion of said cam surface in response to relative sliding movement of said sleeve members in a first direction to urge said die elements into a contracted, thread engaging position in which they engage a threaded member inserted in said one end of said inner sleeve member, and for engaging said second portion of said cam surface in response to relative sliding movement of said sleeve members in a second direction opposite to said first direction to urge said die elements into an expanded position in which they are expanded out of engagement with said threaded member.

* * * * *